United States Patent [19]
Maciel et al.

[11] Patent Number: 6,112,248
[45] Date of Patent: Aug. 29, 2000

[54] METHOD AND SYSTEM FOR DYNAMICALLY BALANCING NETWORK TRAFFIC USING ADDRESS RESOLUTION PROTOCOL

[75] Inventors: Frederico Buchholz Maciel, Kokubunji; Katsuyoshi Kitai, Tokyo; Satoshi Yoshizawa, Musashino; Hideki Murahashi, Hachiouji, all of Japan; Tatsuo Higuchi, Hillsboro, Oreg.

[73] Assignee: Hitachi, Ltd., Tokyo, Japan

[21] Appl. No.: 09/018,564

[22] Filed: Feb. 4, 1998

[30] Foreign Application Priority Data

Feb. 5, 1997 [JP] Japan ..................... 9-022402

[51] Int. Cl.$^7$ ............................. G06F 15/173
[52] U.S. Cl. .................... 709/238; 709/201; 709/203; 709/217; 709/219; 709/239; 709/223; 709/101; 709/105
[58] Field of Search .................... 709/201, 203, 709/217, 218, 219, 101, 105, 223, 235, 239, 159, 164; 395/675

[56] References Cited

U.S. PATENT DOCUMENTS

| | | | |
|---|---|---|---|
| 4,790,005 | 12/1988 | Hanselka et al. | 379/244 |
| 5,289,462 | 2/1994 | Ahmadi et al. | 370/232 |
| 5,434,863 | 7/1995 | Onishi et al. | 370/402 |
| 5,490,252 | 2/1996 | Macera et al. | 709/249 |

FOREIGN PATENT DOCUMENTS

| | | |
|---|---|---|
| 2-202138 | 8/1990 | Japan . |
| 6-85818 | 3/1994 | Japan . |

OTHER PUBLICATIONS

Newton's Telecom Dictionary, Harry Newton, 14th Editon, Flatiron Publishing, 1998.
Internetworking with TCP/IP, vol. 1, Second Edition, 1991, Prentice–Hall International Editions, Douglas E. Comer.
Internet Engineering Task Force, Network Working Group, Nov. 1982, "An Ethernet Address Resolution Protocol", D. Plummer, ARP Protocol, RFC826.
Internet Engineering Task Force, Network Working Group, Jul. 1991, "OSPF Protocol Analysis", J. Moy, RFC 1245.
Internet Engineering Task Force, Network Working Group, Jul. 1991, "Experience with the OSPF Protocol", J. Moy, RFC 1246.
Internet Engineering Task Force, Network Working Group, Jul. 1991, "OSPF Version 2", M. Moym, RFC 1247.
Internet Engineering Task Force, Network Working Group, Oct. 1987, "Using ARP to Implement Transparent Subnet Gateways", S. Carl–Mitchell et al, Proxy ARP RFC1027.
Internet Engineering Task Force, Network Working Group, May 1990, "A Simple Network Management Protocol (SNMP)", J. Case et al, (SNMP) RFC 1157.
Internet Engineering Task Force, Network Working Group, May 1993, "Active Users", J. Postel, (Systat Service) RFC 866.
Fujitsu, High Performance Computing, vol. 47, No. 6, "Hardware of AP3000 Scalar Parallel Server", Nov. 1996, pp. 450–456.
Fujitsu, High Performance Computing, vol. 47, No. 6, Nov. 1996, "Operatiang System of AP3000 Series Scalar–Type Parallel Servers", pp/ 457–463.

(List continued on next page.)

*Primary Examiner*—Frank J. Asta
*Assistant Examiner*—Beatriz Prieto
*Attorney, Agent, or Firm*—Beall Law Offices

[57] ABSTRACT

This invention provides dynamic balance of the traffic among data processing devices interconnecting networks and thereby improve the networking performance. For network traffic flowing between a first network and a second network, the traffic is distributed among the data processing devices that act as routers according to the traffic amount. An algorithm for balancing the traffic is used to select appropriate data processing devices as routers.

14 Claims, 16 Drawing Sheets

OTHER PUBLICATIONS

IBM Systems Journal, vol. 34, No. 2, 1995, "SP2 System Architecture", T. Agerwala et al, pp. 152–184.

Digital Technical Journal, vol. 8, No. 1, 1996, "Design of the TruCluster Multicomputer System for the Digital UNIX Environment", W. Cardoza et al, pp. 5–17.

Hewlett Packard, HP–UX Release 9.0.

Hewlett Packard, HP–UX Reference, vol. 1, Section 1, HP 9000 Computers.

Anupam Bhide et al, "A Highly Available Network File Server," Proceedings of the Winter 1991 USENIX Conference, pp. 199–205.

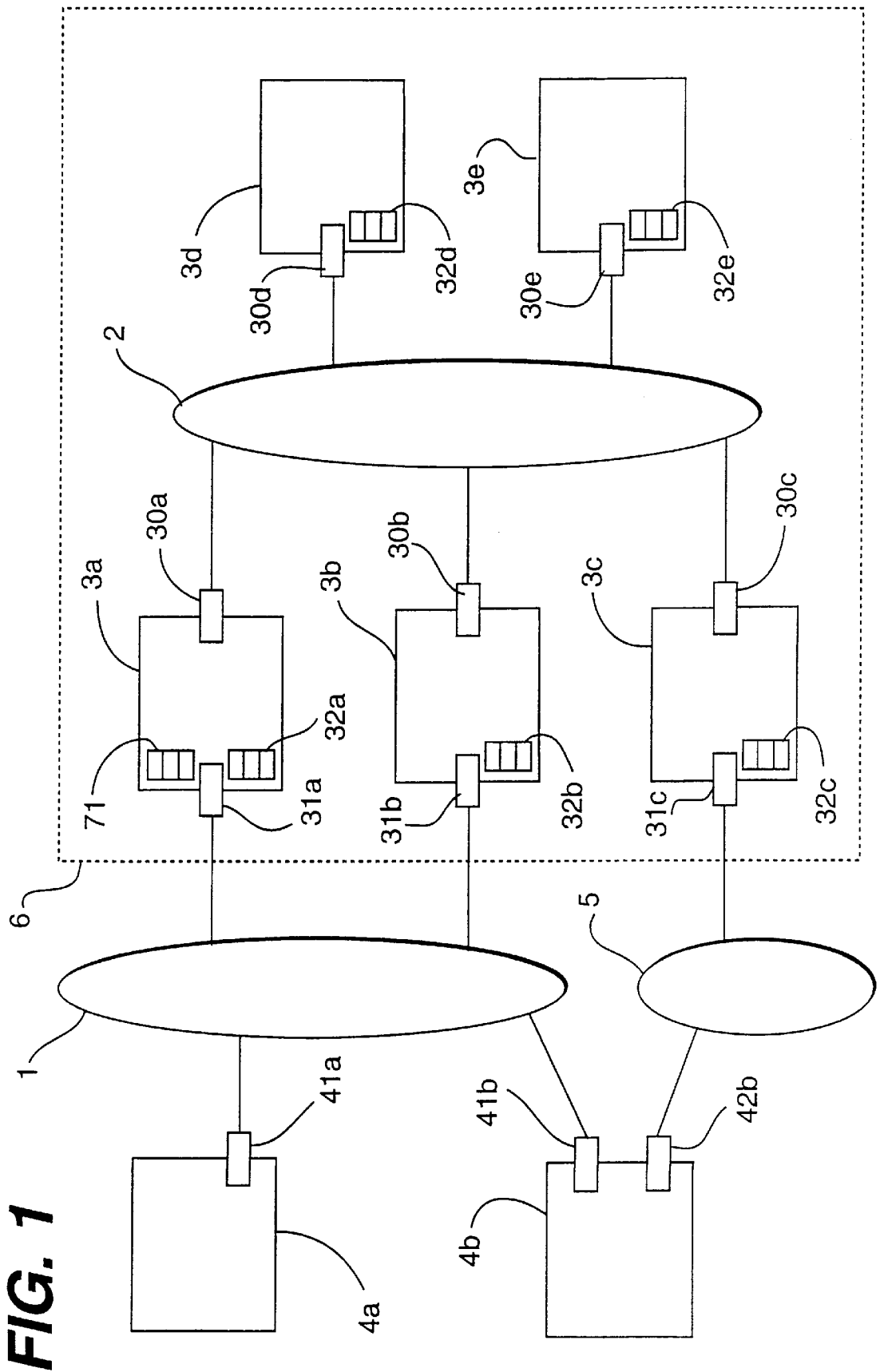

FIG. 2a

| TARGET NETWORK | NEXT HOP | FLAGS |
|---|---|---|
| ... | ... | ... |
| NETWORK 1 | 31a-N | INTERFACE |
| ... | ... | ... |

| TARGET NETWORK | NEXT HOP | FLAGS |
|---|---|---|
| ... | ... | ... |
| NETWORK 1 | 31b-N | INTERFACE |
| ... | ... | ... |

| TARGET NETWORK | NEXT HOP | FLAGS |
|---|---|---|
| ... | ... | ... |
| NETWORK 1 | 30a-N | GATEWAY |
| ... | ... | ... |

| TARGET NETWORK | NEXT HOP | FLAGS |
|---|---|---|
| ... | ... | ... |
| NETWORK 1 | 30a-N | GATEWAY |
| ... | ... | ... |

| TARGET NETWORK | NEXT HOP | FLAGS |
|---|---|---|
| ... | ... | ... |
| NETWORK 1 | 30a-N | GATEWAY |
| ... | ... | ... |

(32e; 321e, 322e, 323e)

| | NETWORK ADDRESS | PHYSICAL ADDRESS | FLAGS |
|---|---|---|---|
| | ... | ... | ... |
| | 30c-N | 31a-P | PUBLIC |
| | 30d-N | 31a-P | PUBLIC |
| | 30e-N | 31a-P | PUBLIC |
| | ... | ... | ... |

| 73 | 731 | 732 | 733 | 734 | 735 | 736 |
|---|---|---|---|---|---|---|
| | TARGET | ROUTER | | | NEXT HOP | PRIORITY |
| | | ID | PHYSICAL | NETWORK | | |
| | ... | ... | ... | ... | ... | ... |
| | NETWORK 1 | 3a | 31a-P | 30a-N | 31a | 1 |
| | | 3b | 31b-P | 30b-N | 31b | 1 |
| | | 3c | — | 30c-N | 42b | 2 |
| | ... | ... | ... | ... | ... | ... |

| | 711 | 712 | 713 |
|---|---|---|---|
| 71 | NETWORK ADDRESS | PHYSICAL ADDRESS | FLAGS |
| | ... | ... | ... |
| | 30a-N | 31b-P | PUBLIC |
| | 30c-N | 31b-P | PUBLIC |
| | 30d-N | 31b-P | PUBLIC |
| | 30e-N | 31b-P | PUBLIC |
| | ... | ... | ... |

*FIG. 15*

| | 321c | 322c | 323c |
|---|---|---|---|
| 32c | TARGET NETWORK | NEXT HOP | FLAGS |
| | ... | ... | ... |
| | NETWORK 1 | 31c-N | INTERFACE |
| | ... | ... | ... |

*FIG. 16a*

| | 321d | 322d | 323d |
|---|---|---|---|
| 32d | TARGET NETWORK | NEXT HOP | FLAGS |
| | ... | ... | ... |
| | NETWORK 1 | 30c-N | GATEWAY |
| | ... | ... | ... |

*FIG. 16b*

| | 321e | 322e | 323e |
|---|---|---|---|
| 32e | TARGET NETWORK | NEXT HOP | FLAGS |
| | ... | ... | ... |
| | NETWORK 1 | 30c-N | GATEWAY |
| | ... | ... | ... |

*FIG. 16c*

METHOD AND SYSTEM FOR DYNAMICALLY BALANCING NETWORK TRAFFIC USING ADDRESS RESOLUTION PROTOCOL

BACKGROUND OF THE INVENTION

The present invention relates to the interconnection among data networks and more specifically to traffic load balancing, for instance, among multiple routers or among multiple interfaces in a parallel processing system (devices).

Computer networks are usually connected to other computer networks and the connection between the computer networks forms internets. Connection between two given networks is implemented by one or more data processing devices (see D. E. Comer, "Internetworking with TCP/IP," volume 1, Prentice Hall, 1991).

These data processing devices include, but are not limited to, routers, gateways and switches, and will be generally and interchangeably referred to as routers or gateways in this specification.

An example shown in FIG. 1 represents a plurality of data processing devices (3a, 3b, 3c, 3d, 3e, 4a, 4b) and three networks (1, 2, 5). The data processing devices 3a, 3b act as routers between network 1 and network 2. The data processing device 3c acts as a router between networks 2 and 5. The data processing device 4b acts as a router between networks 1 and 5. The data processing devices are connected to the networks by network interfaces (30a, 30b, 30c, 30d, 30e, 31a, 31b, 31c, 40b, 41a and 41b). These network interfaces (30a, 30b, 30c, 30d, 30e, 31a, 31b, 31c, 42b, 41a and 41b) are identified by physical addresses and also by network addresses.

On various kinds of networks, the ARP protocol (Address Resolution Protocol) (see "Internet Engineering Task Force RFC 826") is used to correlate physical and network addresses. Physical and network addresses hereafter are given by a notation consisting of the interface number of FIG. 1, a dash, and a suffix "P" or "N" indicating that the address is a physical address or a network address.

When a data processing device in one network communicates with a data processing device in another network, the communication between the two data processing devices is done by using one or more routers (data processing devices) between one network and the other network, to transfer a communication message (packet) from one network to the other network. Generally, the correlation between a network (target network) to which a packet (communication) is transferred to and a router that transfers the packet to the target network is shown in a routing table of the data processing devices (see "Internetworking with TCP/IP" cited above). This method for indicating the route is, hereafter, referred to as an "explicit routing table setup". In FIG. 1, data processing devices 3a, 3b, 3c, 3d and 3e have routing tables 32a, 32b, 32c, 32d and 32e, respectively. FIGS. 2a–2e show an example of routing tables in the explicit routing setup for routes which transfer packets from the data processing devices (3a, 3b, 3c, 3d, 3e) connected to the network 2 of FIG. 1 to the network 1. Routing tables (32a, 32b, 32c, 32d, 32e) each have an entry (321a, 321b, 321c, 321d, 321e) representing a target network, an entry (322a, 322b, 322c, 322d, 322e) representing a next hop address of the target network, and a flag (323a, 323b, 323c, 323d, 323e). The flag may have the values "interface" or "gateway". When the value of the flag is "interface", the next hop address means the address of the network interface which is directly connected to the target network, in case the data processing device in question is directly connected to the target network. When the value of the flag is "gateway", the next hop address means the address of a router which transfers packets to the target network. This value of the flag is used in case a data processing device in question is not connected to the target network.

In the routing tables of the data processing devices 3a, 3b, the network addresses (31a-N, 31b-N) of their respective interfaces to the network 1 are shown as the next hops (322a, 322b), and the value of the flag is "interface" (323a, 323b). The routing tables of the data processing devices 3c, 3d, 3e give 30a-N as the next hop (322c, 322d, 322e) and the value of the flag is "gateway" (323c, 323d, 323e), thus showing that the data processing device 3a is a router to network 1.

Other methods can be used to interconnect two or more networks. Two of these methods (Proxy ARP, OSPF protocol) are explained below.

Proxy ARP (where "ARP" is the Address Resolution Protocol) is a method for making routers transparent in communication between two or more networks (see RFC 1027), by making one or more routers in the networks act as proxies. On communications from one network to another network, the routers reply ARP requests on the former network querying a network addresses in the later network, then receive communications on the former network addressed to the later network and route them to the later network. Thus, these routers transparently bridge two or more networks (refer to "Internetworking with TCP/IP" cited above). To this end, the correlation between the physical addresses and the network addresses needs to be set up.

FIG. 3 shows an example of such a setup (proxy ARP setup), in which the correlation between network addresses 711 and physical addresses 712 is set as special entries on the ARP cache 71. In this example, the router 3a acts as a proxy for communication flowing from the network 1 to the network 2. The "public" flag 713 indicates that the entry should be used to answer ARP queries. In this example, any ARP queries for network addresses 30c-N, 30d-N and 30e-N in the network 1 will be answered by 31a-P. FIG. 3 shows an example of this setup accomplished in the ARP cache of the data processing device 3a. This setup can be implemented in the ARP cache of any of the data processing devices 3a, 3b, 4a and 4b connected to the network 1.

The proxy ARP setup as implemented above and the explicit routing table setup are both performed by the administrator of each data processing device. This means that these setups are static, i.e., once performed they remain the same and can only be changed by manual intervention by the administrator. Hence, when there is a malfunction or when a new router is installed, these setups must be changed manually.

A method of changing the routing table dynamically according to changes in the network is provided by the OSPF protocol (see RFC 1245, 1246 and 1247). In this case, the routers exchange routing information and change their routing tables according to this information.

The basic algorithm of the OSPF protocol is shown in FIG. 4. The data processing device broadcasts a message including the networks it can reach and the distances to these networks determined by the number of hops (step 822), and also receives such messages from other data processing devices (step 823). When a route changes (step 824), each router calculates the shortest path from itself to each of the networks (step 825) and sets its routing table according to the paths (step 826).

FIG. 5 shows an example of the use of the OSPF in the networks of FIG. 1. In this figure, all the data processing devices (3a, 3b, 3c, 3d, 3e, 4a, 4b) interchange data by using the OSPF protocol and thus have a control add-on 91 for executing the OSPF basic algorithm. Alternatively, the OSPF can be used only in a subset of the networks 1, 2, 5 or in a subset of the data processing devices (3a, 3b, 3c, 3d, 3e, 4a, 4b), or in both subsets.

In a special case, interconnected networks include not only parallel processing devices but also massively parallel processing devices and workstation clusters. These parallel processing devices contain a plurality of nodes that are interconnected by networks. Examples of such machines are Fujitu's AP3000, IBM's RS/6000 SP, and Digital Corp.'s Tru-Cluster. The case of a parallel processing device is shown in FIG. 1, in which the data processing devices connected to the second network 2 are the nodes of the parallel processing device 6. In this configuration, the parallel processing device has multiple interfaces for other networks to improve the reliability and the networking performance. The data processing devices (4a, 4b) of other networks (1, 5) are mainly clients which access the services provided by the parallel processing device 6.

SUMMARY OF THE INVENTION

In the above examples (in the case of using FIG. 2 and FIG. 3), all communication between the network 1 and the data processing devices (3c, 3d, 3e) pass through only the data processing device 3a. Therefore, the data processing device 3a is a potential bottleneck for this communication. This bottleneck can be alleviated by assigning a part of the communication to the router 3a (the data processing device 3a) and by assigning other part of the communication to the router 3b, so that the traffic (communication) passes through two routers. Herein, the data processing device is a normal computer which has a processing unit, a memory, a disk, a cache, an interface for the network, and so on, and an operating system; and an application program stored in the memory and the disk are executed by the processing unit. However, the network traffic changes with time, and if most of the network traffic flows through the data processing device assigned as one of the routers at a certain time, the bottleneck persists. Hence, balance of the traffic among multiple routers must be controlled dynamically, rather than statically, in order to be effective.

The explicit routing table setup and the Proxy ARP setup are static and thus can provide static traffic balancing, but not dynamic traffic balancing.

The OSPF protocol definition (RFC 1247) states that "when there exist several equivalent routes to a destination, traffic is distributed equally among them," but does not mention the method of distributing the traffic. The OSPF protocol leaves the distribution of the traffic to the execution of the routing algorithm. Therefore, although in the OSPF the route changes dynamically, the OSPF by itself cannot provide dynamic traffic balancing.

Data processing devices which execute user programs such as personal computers and workstations, are often used as routers. Because the routing generates processing load, the processing performance of such data processing devices is decreased by the processing load created by the routing. Hence, when selecting a route so as to balance the network traffic, it is necessary to additionally consider the processing load to improve the networking performance and the processing throughput. As in the network traffic, the processing load changes with time and thus the route must be changed dynamically with the processing load. As described earlier, the explicit routing table setup and the Proxy ARP setup are static and therefore cannot provide such dynamic traffic balancing. The OSPF protocol selects the routers that give the shortest path to the target network but this selection does not consider the processing load of the routers. Therefore, the OSPF protocol cannot provide dynamic traffic balancing according to the processing load of the routers.

It is desirable that the routing be changed in the event of a network failure to provide reliability. Such a feature is provided by the OSPF and is desirable also for Proxy ARP. However, because the Proxy ARP setup is static, it cannot provide such a dynamic traffic change.

The problem of traffic balancing among a plurality of routers between two networks is solved by choosing for each data processing device, a router which transfers the network traffic of this data processing device, based on the amount of network traffic of each data processing device. Next, the routing tables of the data processing devices, the Proxy ARP association between physical and network addresses, and the routes to be used by the OSPF protocol are set by the above selection. This procedure is cyclically repeated to provide dynamic traffic balancing.

The problem of the processing load in traffic balancing is solved by using an equivalent the amount of network traffic, which is appropriately converted from the processing load of the router, in the above procedure of selecting the routers.

The problem of reliability of the Proxy ARP is solved by executing the above traffic balancing procedure and by not distributing the network traffic to those routers whose normal operation is prevented by some malfunction. Furthermore, when a router failure or a router recovery is detected, the routes should also be selected.

BRIEF DESCRIPTION OF THE DRAWINGS

FIG. 1 is an example of a network in which this invention is embodied.

FIG. 2a is an explanatory diagram of a routing table setup of a data processing device 3a in FIG. 1.

FIG. 2b is an explanatory diagram of a routing table setup of a data processing device 3b in FIG. 1.

FIG. 2c is an explanatory diagram of a routing table setup of a data processing device 3c in FIG. 1.

FIG. 2d is an explanatory diagram of a routing table setup of a data processing device 3d in FIG. 1.

FIG. 2e is an explanatory diagram of a routing table setup of a data processing device 3e in FIG. 1.

FIG. 15 is an explanatory diagram of an ARP cache setup in an interface failure.

FIG. 16a is an explanatory diagram of a routing table setup of a data processing device 3c in multiple router failures.

FIG. 16b is an explanatory diagram of a routing table setup of a data processing device 3d in multiple router failures.

FIG. 16c is an explanatory diagram of a routing table setup of a data processing device 3e in multiple router failures.

DETAILED DESCRIPTION OF THE PREFERRED EMBODIMENT

The whole process of traffic balancing includes the following three steps: (1) choosing (selecting) the routers, (2) calculating the distribution of traffic among these routers, and (3) changing the route according to the distribution, in that order. These three steps are described in this order and some examples are given in the explanation of the three steps. All the following explanations concerns a single network hereinafter referred to as "the network in question." Other networks are henceforth referred to as "target networks."

The explicit routing table setup and the OSPF are used to set the routes for communication from the network in question to the target network. The Proxy ARP is used to set the routes for communication from the target network to the network in question. Hence, when the data processing devices connected to the second network 2 are nodes of the parallel processing device 6, the explicit routing table setup and the OSPF are used to set the routes for communication from the parallel processing device 6 to the clients 4a, 4b. The Proxy ARP is used to set the routes for communication in the reverse direction.

(1) Selection of routers

Selection of routers is made to provide reliability. This is done by selecting normally operating routers from among all possible routers to the target network. This selection process is done in OSPF. In the case of the explicit routing setup and the Proxy ARP, the following procedure is used. First, the network administrator has to prepare a global routing table for the network in question.

Figures 6, 10:
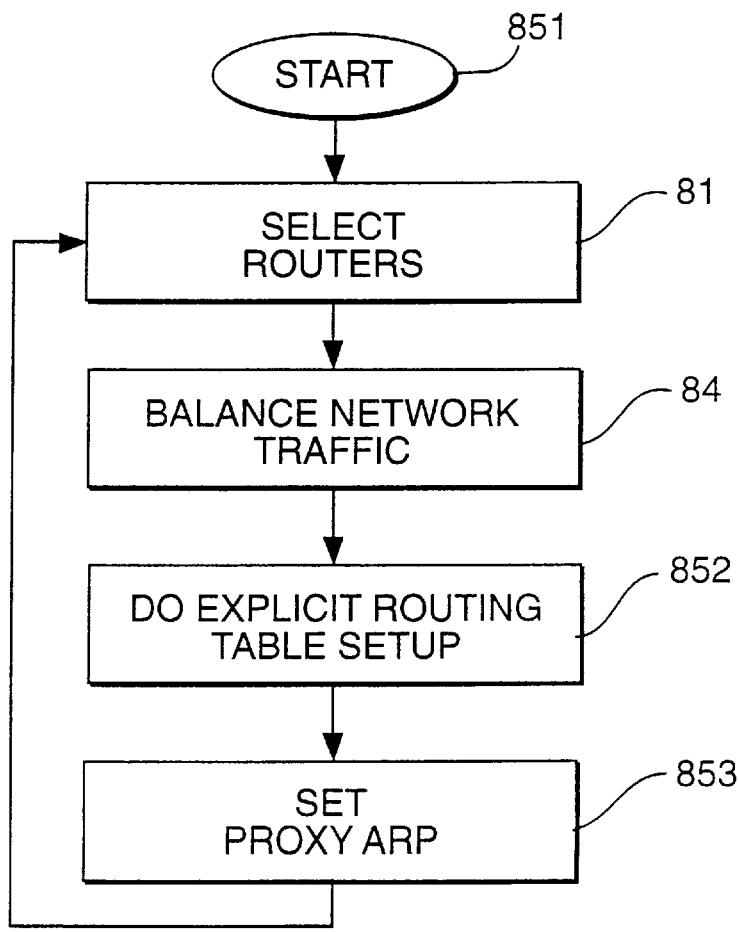
FIG. 6 is an explanatory diagram of a global routing table.
FIG. 10 is a flowchart of a procedure for balancing the traffic when OSPF is not used.

FIG. 6 shows an example 73 of a global routing table for the network 2, i.e., the network in question. For each target network 731, this table shows a router (ID) 732 to this network. For each router, this table shows a physical address 733 of the interface to the target network, a network address 734 in the network in question, the next hop 735 to the target network after this router, and a priority 736 of the route. This priority is set by the network administrator according to the number of hops up to the target network and according to the network processing capability. Hence, the best route will be selected preferentially. In FIG. 6, priority is 1 when the number of hop is 1 and priority is 2 when the number of hops are 2.

Figures 7, 8:
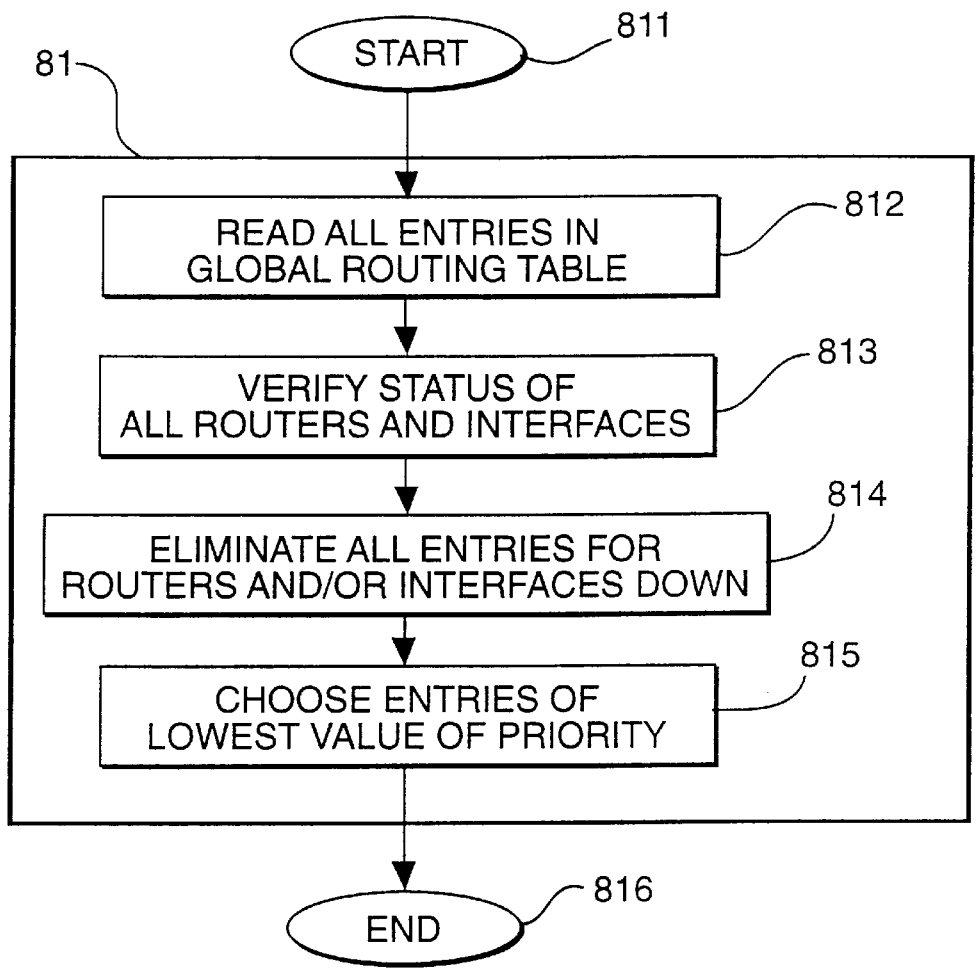
FIG. 7 is a flowchart of an algorithm for selecting routers.
FIG. 8 is a diagram correlating the processing load and the network traffic.

The global routing table 73 in FIG. 6 is used as an input to the algorithm for selecting routers in FIG. 7. At a first step (step 812), the algorithm reads all entries in the global routing table (73) in a memory. At the next step (step 813), the algorithm verifies the status of all routers (732), i.e., if the routers (732) are active or not, and if the indicated network interfaces (733, 734, 735) are active or not. At the next step (step 814), the algorithm removes all router entries (732, 733, 734, 735, 736) from the table in the memory for which the routers or interfaces are not active. At the next step (step 815), the algorithm selects router entries (732, 733, 734, 735, 736) with the lowest value of priority (736) and eliminates other router entries (732, 733, 734, 735, 736) from the table in the memory. At step 815, for each network, the data processing devices that are to operate as routers to the target network 731 appear in the column 732.

(2) Calculating the distribution of traffic among the routers

Once the routers have been chosen, the routes can be selected. First, the network administrator has to prepare for the network in question a list of the data processing devices involved in the traffic balancing. FIG. 8 shows an example of such a list for the network 2. The list of the data processing devices 72 includes the identification code (ID) 721 for discriminating all data processing devices for which traffic balancing is applied to and the factors a(k) 722 for correlating the processing load of this device and the routing load. The factors a(k) will be described below in more detail.

Figure 9:
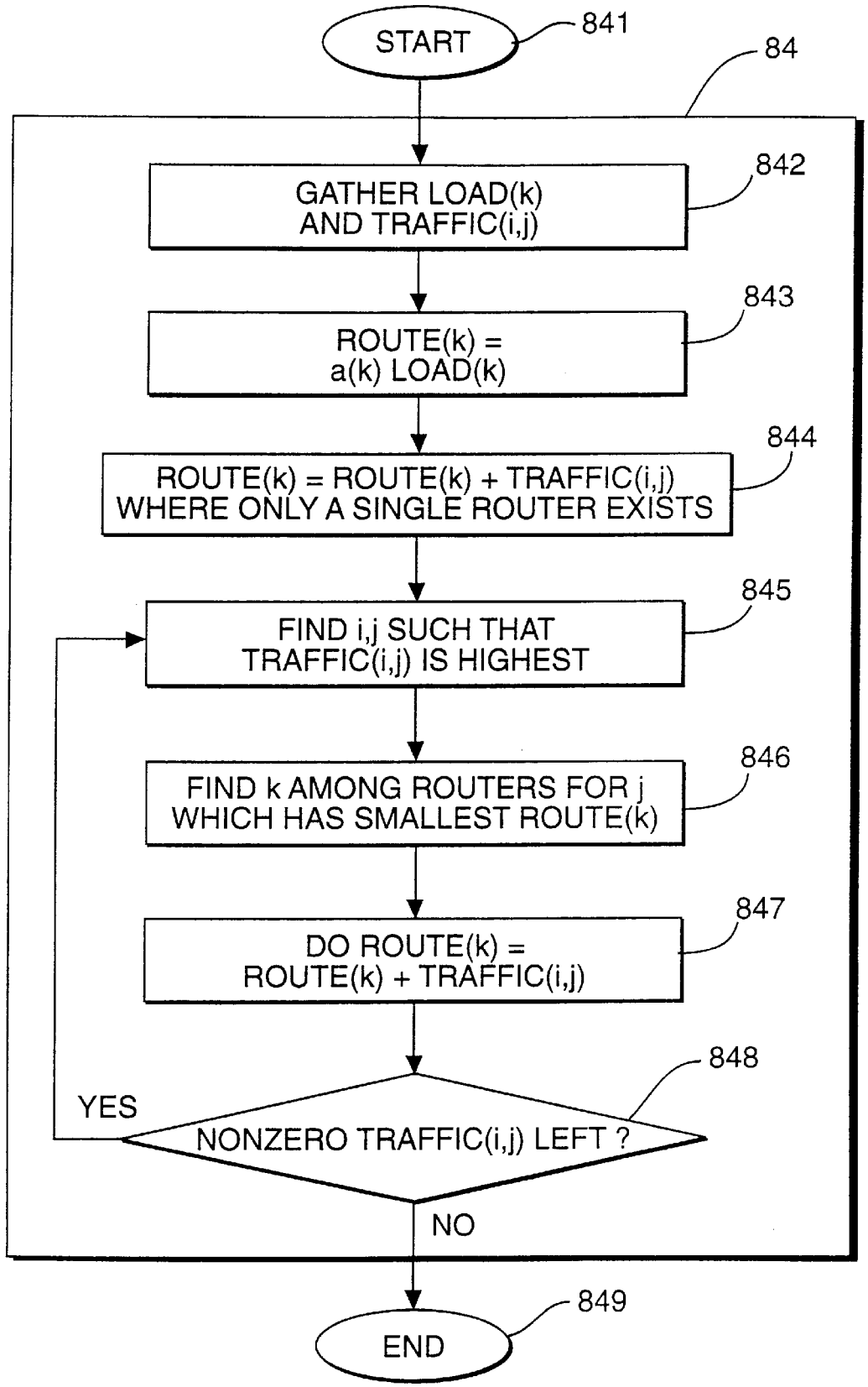
FIG. 9 is a flowchart of an algorithm for distributing the traffic.

The algorithm for the calculation (84) of the routes to provide traffic balancing is shown in FIG. 9. Herein, "i" is an index of a data processing device that does not operate as a router, "j" is an index of the target network (731 in FIG. 6), and "k" is an index of a data processing device that acts as a router (732 in FIG. 6). The traffic (i, j) is the traffic between the data processing device i and the network j. A load (k) is the processing load of a data processing device, and it is equal to or larger than zero. The load (k) increases with the processing load of the data processing device when this data processing device can execute user programs, and when it cannot, is equal to zero. The algorithm also uses the value of route (k) representing the amount of traffic (i, j) assigned to the router k. The algorithm basically distributes the traffic (i, j) among the routes (k) in such a way that the values of the routes (k) among different routers k are balanced.

The algorithm for selecting a route is given in FIG. 9.

At the first step (step 842), the algorithm obtains the total traffic (i, j) and the load (k) from other data processing devices.

At the next step (step 843), the algorithm initializes the value of the route (k) to a(k)×load (k) (route (k)=a(k)×load (k)), where a(k) (722 in FIG. 8) is taken from the data processing device list (72). Hence, the processing load of the router is incorporated into the calculation as a networking load. The "constant a(k)" provides the tradeoff between the network traffic balancing and the processing load balancing among the routers. Lower overall values of a(k) give priority to the network traffic balancing and higher overall values give priority to the processing load balancing. The relative values of a(k) represent the performance of a data processing device, wherein lower values of a(k) represent higher performance of the data processing devices (i.e., a lighter processing load is produced by routing the same amount of network traffic).

At the next step (step 844), the algorithm calculates route(k)=route(k)+traffic (i, j) for all k in which all the traffic between the networks can flow only through this router k. All the values of traffic (i, j) used at this stage (step 844) are set to zero.

At the next step (step 845), the algorithm obtains i and j so that the traffic (i, j) that is selected is the highest value of traffic (i, j) which is left.

At the next step (step 846), the algorithm finds k that has the smallest value of route (k) among the routers for the target network j. This selection means that the network traffic between the network j and the data processing device i is to pass through the router k.

At the next step (step 847), the traffic is assigned to the router k found in step 846, i.e., route (k)=route (k)+traffic (i, j) for the i and j selected in step 845, whose traffic (i, j) is then set to zero.

At the final step (step 848), if there is any non-zero value of the traffic (i, j), the algorithm returns to the step (step 845).

(3) Changing the route according to the distribution

Once the correspondence between the data processing devices and the routers is obtained, the corresponding routes are set. The process of setting the routes varies depending on whether the OSPF is used or not.

When the OSPF is not used, the whole process of traffic balancing (i.e., three steps of (1) selecting routers, (2) calculating the distribution of traffic among these routers, and (3) changing the route according to the distribution) is shown in FIG. 10. After selecting the router (step 81) and traffic distribution (step 84), the algorithm executes an explicit routing table setup (step 852) and Proxy ARP setup (step 853). The process is periodically repeated to provide dynamic load balancing.

The setup for routes for the explicit route setup (852) is done as follows. The route for the target network (731 in FIG. 6), which is set in the data processing device to be used as a router, is taken from the column of the next hop (735 in FIG. 6) in the global routing table 73 in FIG. 6. In this column 735, the next hop corresponds to the above mentioned router. In this case, the flag 323 is set to "interface." The routes for other data processing devices and for the data processing devices that can work as routers but whose network interfaces for the target network is inactive, are taken from the column of network 734. In this column 734, the network corresponds to the router assigned to the data processing device at step 847. In this case, the flag is set to "gateway." The routes are not set for the inactive data processing devices or for the network in question whose network interfaces are not active.

The setup (853) for routes for the Proxy ARP is as follows. The network address of the interface of a data processing device is related to the physical address of the interface of the router selected for this data processing device. The physical address is taken from the physical address column (733) of the global routing table 73. If the data processing device with the Proxy ARP linkage is not operational, the Proxy ARP linkage should be set in another data processing device connected to the target network (731). The Proxy ARP setup is only performed when the target network (731) is adjacent to the network in question. When the physical address entry (733) of the global routing table 73 is blank, the interconnection using the Proxy ARP is not possible. Hence the Proxy ARP setup is not performed. When the ARP linkage changes, the data processing device having this linkage can broadcast an ARP reply having a new ARP linkage. In this case, other data processing devices in the target network (731) receive this reply. The other data processing devices compare the linkage contained in the reply with the content of their own ARP cache. Then, if any change is found, the other data processing devices change the linkage in the ARP cache to the linkage contained in the reply, and the other data processing devices transmit the traffic to the new physical address.

Therefore, if an ARP reply is broadcast when the linkage changes, the new linkage is reflected on the data processing devices, realizing the dynamic traffic balance of the network traffic among routers. When the ARP reply is not broadcast, the new linkage is reflected on the data processing devices that send ARP queries to the target network (731) later.

In any of the data processing device (3, 4) that execute user programs, the algorithm of FIG. 10 can be executed by running a control add-on which uses hardware and/or software.

Figure 11:
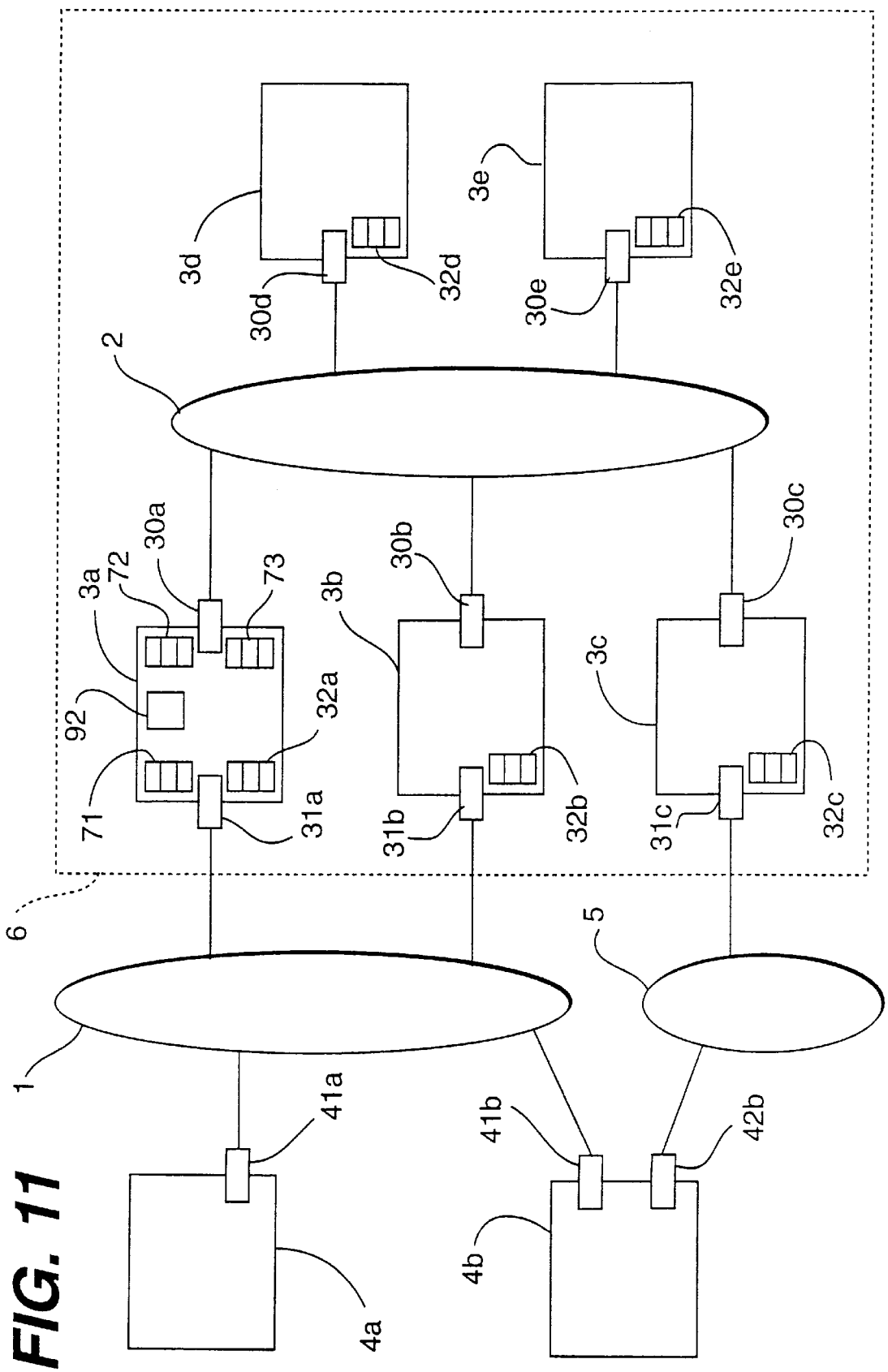
FIG. 11 is a block diagram of an embodiment that does not use the OSPF.

FIG. 11 shows a preferred embodiment of this invention. A control add-on (92) is installed in the same data processing device in which an ARP cache (71) is provided, to facilitate the setup of the ARP cache. Alternatively, the control add-on (92) can be located in any of the data processing devices (3*a*, 3*b*, 3*c*, 3*d*, 3*e*, 4*a* and 4*b*). In the case of a parallel processing device (6), a preferred embodiment for the control add-on (92) is in one of the nodes (3*a*, 3*b*, 3*c*, 3*d* and 3*e*) of the parallel processing device. This is because special features of the operating system of the parallel processing device (6) can be used to gather data from other nodes and execute the setup in other nodes.

The values of the traffic (i, j) and the load (k) can be taken from a data processing device in which the control add-on (92) is located by a system call. The network traffic and the traffic (i, j) of other data processing devices can be obtained, for example, by the Simple Network Management Protocol (SNMP, see RFC 1157). The processing load of other data processing devices can be obtained by, for instance, the rwho protocol or the Internet Systat Service. The routes and the Proxy ARP linkage can be changed by a system call in a data processing device in which the control add-on (92) is running and by the SNMP protocol in other data processing devices.

An example of the algorithm of FIG. 10 applied to the examples of FIG. 1 and FIG. 6 is as follows. It is assumed that the network traffic associated with the network 1 of the data processing devices 3*c*, 3*d*, 3*e* is 1 M byte/sec for each device and the traffic (i, j) is the network traffic measured in M byte/sec. It is also assumed that the data processing devices 3*a*, 3*b*, 3*c* and their interfaces operate without malfunction, that the data processing devices have the ability to execute user processes, that the data processing devices 3*a* and 3*c* are not executing user processes and the data processing device 3*b* is executing one user process, and that the load (k) in a data processing device k is measured by the number of user processes in the data processing device k.

The algorithm (81) for selecting routers reads the global routing table 73 at the first step (step 812) and, at the next step (step 813), verifies that the data processing devices 3*a*, 3*b*, 3*c* and their interfaces operate without malfunction. At the next step (step 814), the entries of these data processing devices (3a, 3b, 3c) are not eliminated from the table as they (3a, 3b, 3c) are active. At the step 815, the data processing devices 3a and 3b are selected because they have the smallest value of priority. Hence, the data processing devices 3a and 3b are selected as routers between the network 1 and the network 2.

Next, at the first step (step 842), the algorithm (84) for balancing the traffic obtains the processing loads of the data processing devices 3a and 3b and the network traffic between the network 1 and the data processing devices 3c, 3d, 3e. At step 843, the route (3a) is assigned 0 and the route (3b) is assigned 1.5. At step 844, no traffic is assigned to the network 1.

Next, the algorithm repeats the steps 845, 846 and 847 three times and assigns the traffic to the routers. The data processing devices 3c, 3d, 3e are assumed to have been selected in that order at step 845. Thus, in the first repetition, the data processing device 3c is assigned to the router 3a and the route (3a) is updated to 1 (=(traffic=1)+(route(3a)=0)). In the second repetition, the data processing device 3d also is assigned to the router 3a and the route (3a) is updated to 2 (=(traffic=1)+(route(3a)=1)). In the third repetition, the data processing device 3e is assigned to the router 3b and the route (3b) is updated to 2.5 (=(traffic=1)+(route(3b)=1.5)). Therefore, the network traffic of the data processing devices 3c, 3d, 3e is distributed between the data processing devices 3a, 3b, because the data processing device 3b has a heavier processing load, greater traffic is given to the data processing device 3a. The route to and from the data processing device 3e is changed to the router 3b in this way.

Figure 12:
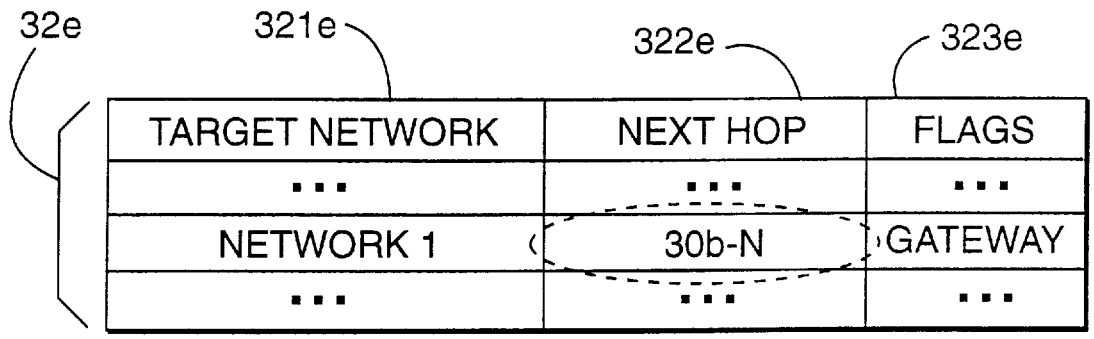
FIG. 12 is an explanatory diagram of a routing table setup for balancing traffic.
Figure 13:
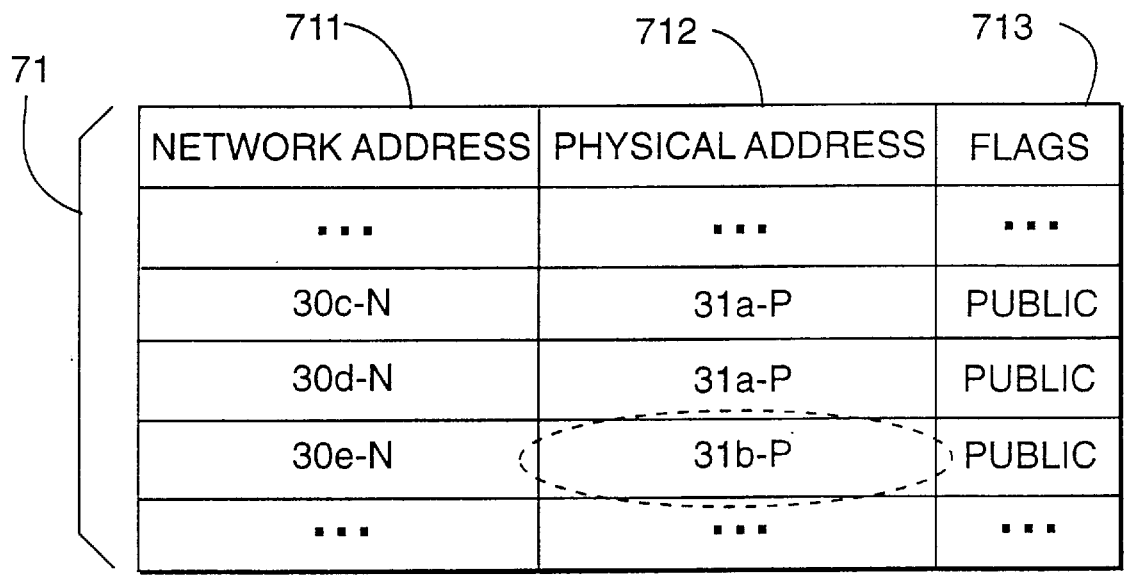
FIG. 13 is an explanatory diagram of an ARP cache setup for distributing the traffic.
Figure 14A:
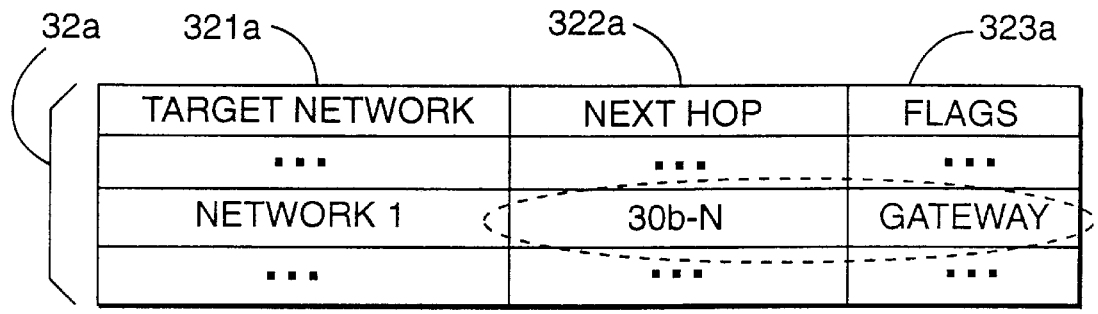
FIG. 14a is an explanatory diagram of a routing table setup of a data processing device 3a in an interface failure.
Figure 14B:
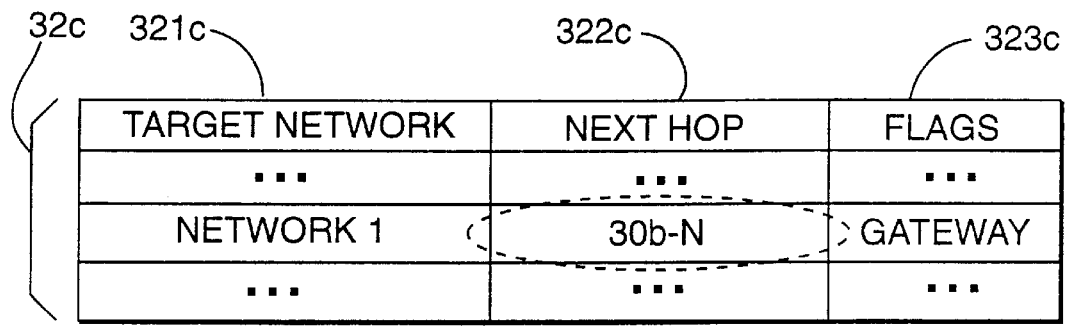
FIG. 14b is an explanatory diagram of a routing table setup of a data processing device 3c in an interface failure.
Figure 14C:
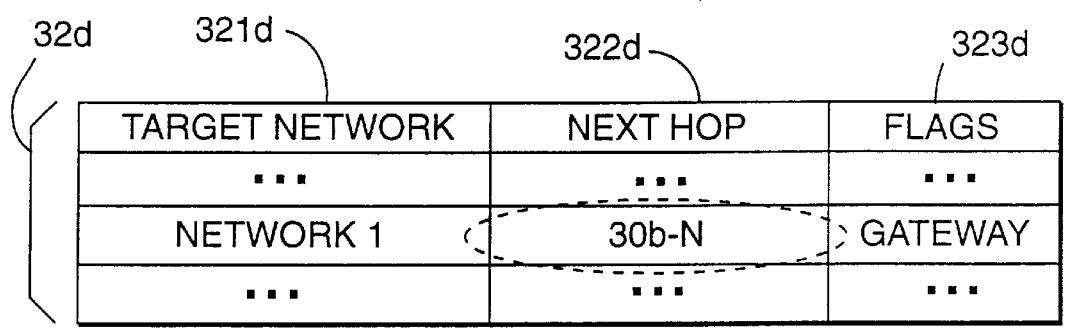
FIG. 14c is an explanatory diagram of a routing table setup of a data processing device 3d in an interface failure.
Figure 14D:
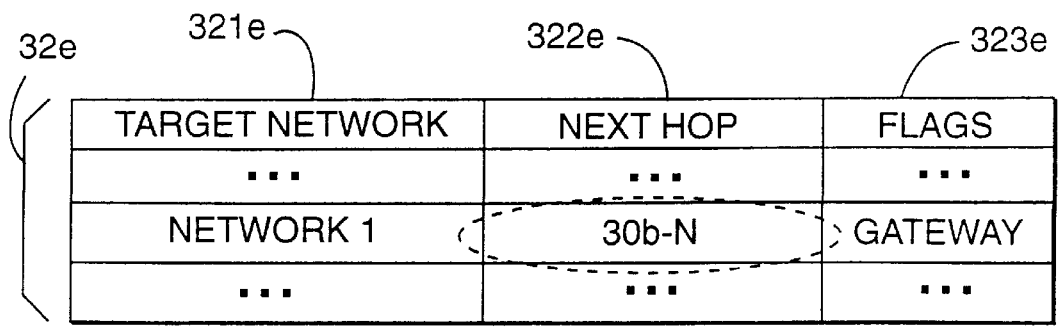
FIG. 14d is an explanatory diagram of a routing table setup of a data processing device 3e in an interface failure.

The routing table of the data processing device 3e after the explicit routing table setup (step 852) is executed and is shown in FIG. 12. The ARP cache after executing the Proxy ARP setup (step 853) is shown in FIG. 13. The entry encircled by a dotted line is a changed one.

Two examples for explaining reliability will be described below.

The first example is one in which the network interface of the data processing device 3a (31a) in the network 2 fails, but data processing device 3a continues operating. In the algorithm (81 in FIG. 7) for selecting routers, the failure of the data processing device 3a is detected at step 813 and the entry of this failed router is eliminated at step 814. The entry of the data processing device 3b is selected at step 815 because it has the lowest priority value. Thus, only the data processing device 3b is used as the router. Next, in the traffic distribution algorithm (84 in FIG. 9), the traffic of the data processing devices 3a, 3c, 3d, 3e are assigned to the router 3b. The routing tables (32a, 32c, 32d, 32e) of the data processing devices 3a, 3c, 3d, 3e after the explicit routing table setup (step 852) is performed are shown in FIGS. 14a–14d. The ARP cache (71) after the Proxy ARP setup (step 853) is shown in FIG. 15. The entry encircled by a dotted line is a changed one. In this example, the communication among the data processing devices (3a, 3b, 3c, 3d and 3e) in the second network is not affected by failures of the network interfaces. Similarly, in the case of the parallel processing device (6), the communication between the parallel processing device and the clients (4a, 4b) continues even after the route has been changed.

Another example concerning reliability is a case that both data processing devices 3a and 3b totally fail. In this case, the algorithm (81) for selecting routers detects the failures of the data processing devices 3a and 3b at step 813. And the entries of these routers are eliminated at step 814. Thus, only the entry of the data processing device 3c remains and is selected as the router. Next, in the traffic distribution algorithm (84), the traffic of the data processing devices 3d and 3e is assigned to the router 3c. The routing tables (32c, 32d, 32e) of the data processing devices 3c, 3d, 3e after the explicit routing table setup (852) are shown in FIGS. 16a–16c. All of the entries in the ARP cache (71) have been eliminated because the physical address (733) corresponding to the router 3c are not set. In this example, the communication between the data processing devices (3c, 3d, 3e) that are still active in the network in question and the data processing devices (4a, 4b) in the target network are interrupted. This is because only the route from the network 2 to the network 1 is set and the route from the network 1 to the network 2 is not set. However, if the same system is also applied to the network 1, the traffic from the network 1 to the network 2 can flow through the data processing device 4b, and therefore the communication between the networks 1 and 2 is not interrupted. The same also holds for the parallel processing device (6).

When the OSPF is used in the network in question, two major differences arise. First, the router is selected by the OSPF processing, and therefore the OSPF is used in place of the router selection algorithm (81). Second, while the router exchange routes by the OSPF operate in such a way as to perform distribution, the router selection algorithm (81) and the traffic distribution algorithm (84) should be executed in a centralized fashion, to avoid inconsistencies among the routes selected by various data processing devices, and to prevent the processing load that may be produced if all of the data processing devices query the processing load and networking traffic of one another.

Thus, the OSPF (Open System Path First) is extended as follows. One of the data processing devices that exchanges data by the OSPF (hereinafter referred to as "master") is responsible for centralized tasks such as that of selecting the routes and broadcasting these routes to other data processing devices that execute the OSPF. Other data processing devices (hereinafter referred to as "slaves") set these routes accordingly. A detailed description of the procedure performed by the master and the slaves is as follows.

Figures 3, 4:
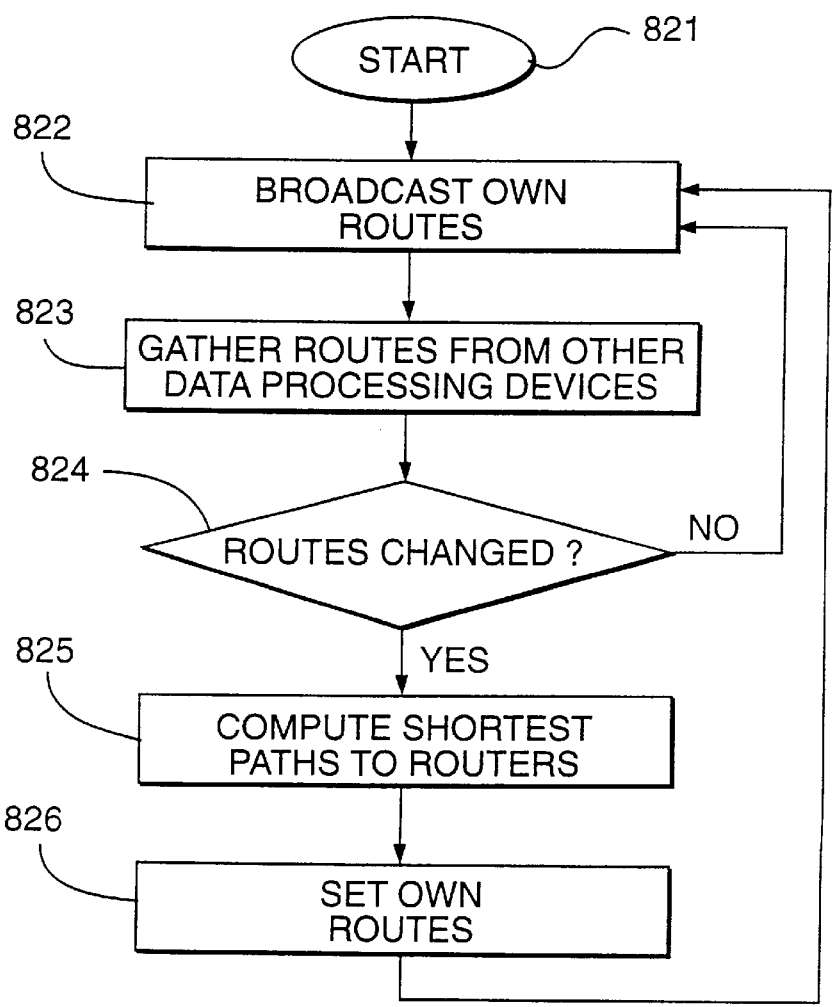
FIG. 3 is an explanatory diagram of an ARP cache setup for Proxy ARP.
FIG. 4 is a flowchart of the basic operation of the OSPF algorithm.
Figure 5:
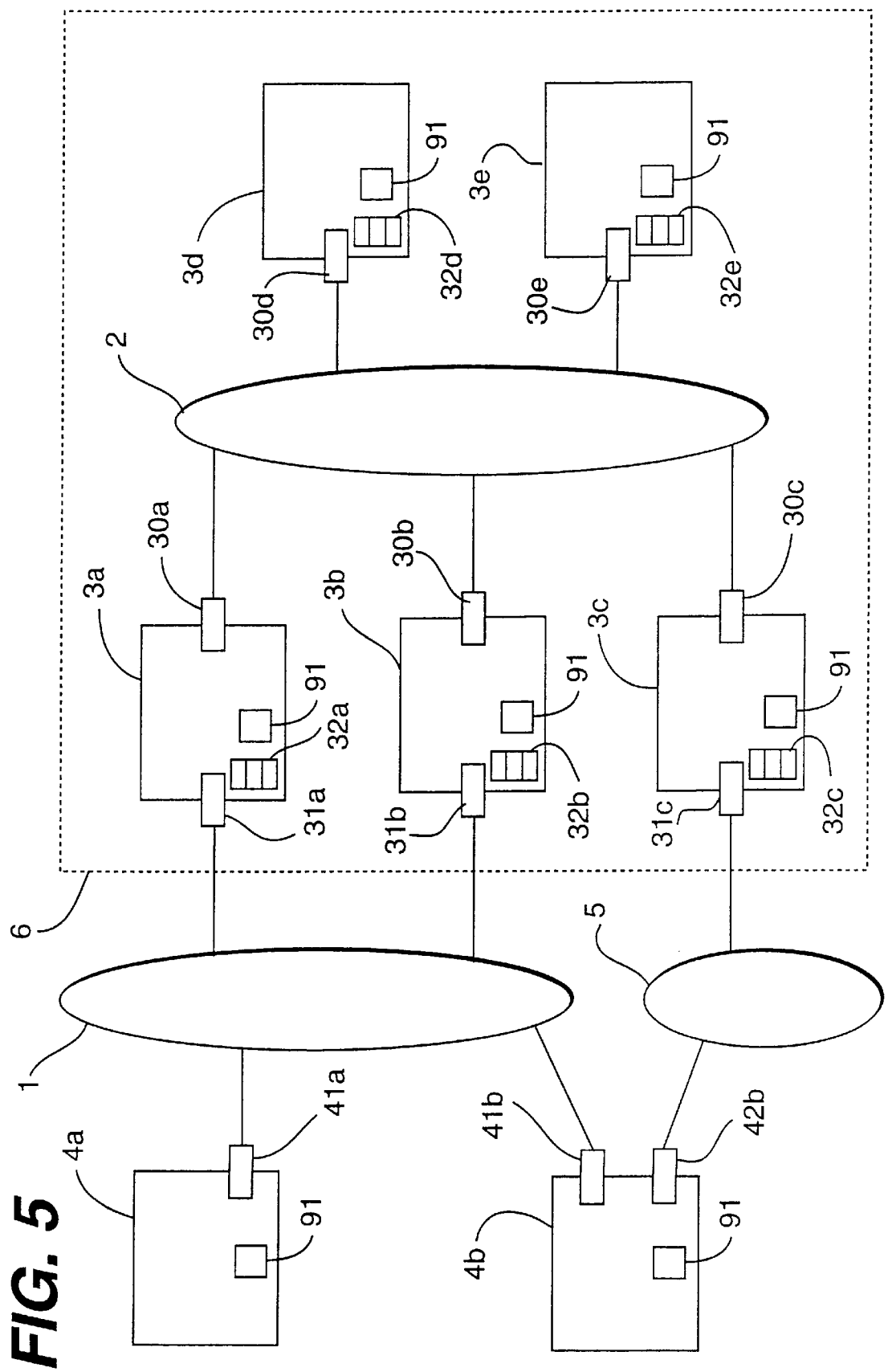
FIG. 5 is a block diagram of a control add-on for the OSPF.
Figure 17:
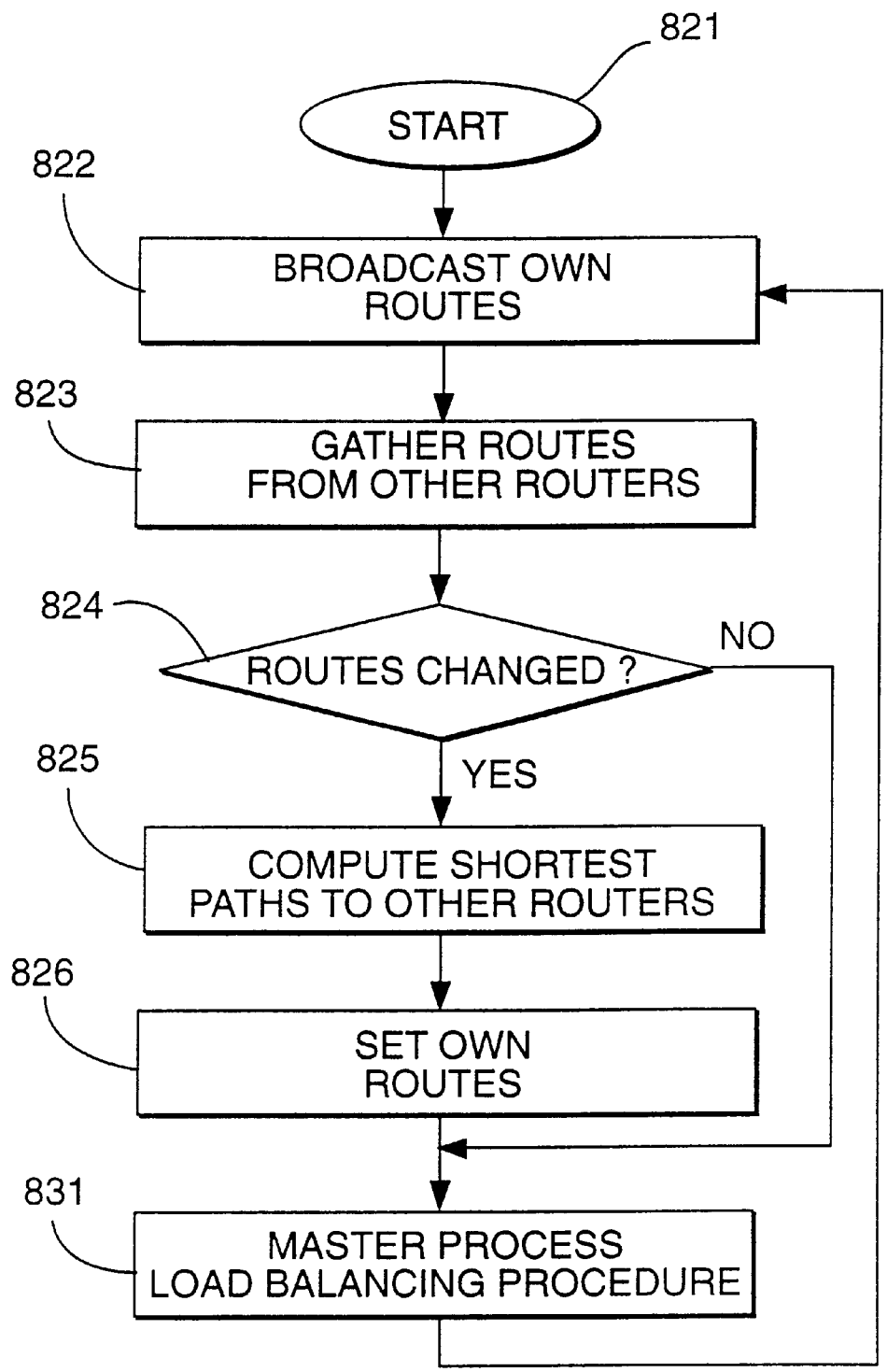
FIG. 17 is a flowchart of a procedure executed by an OSPF master device.
Figure 18:
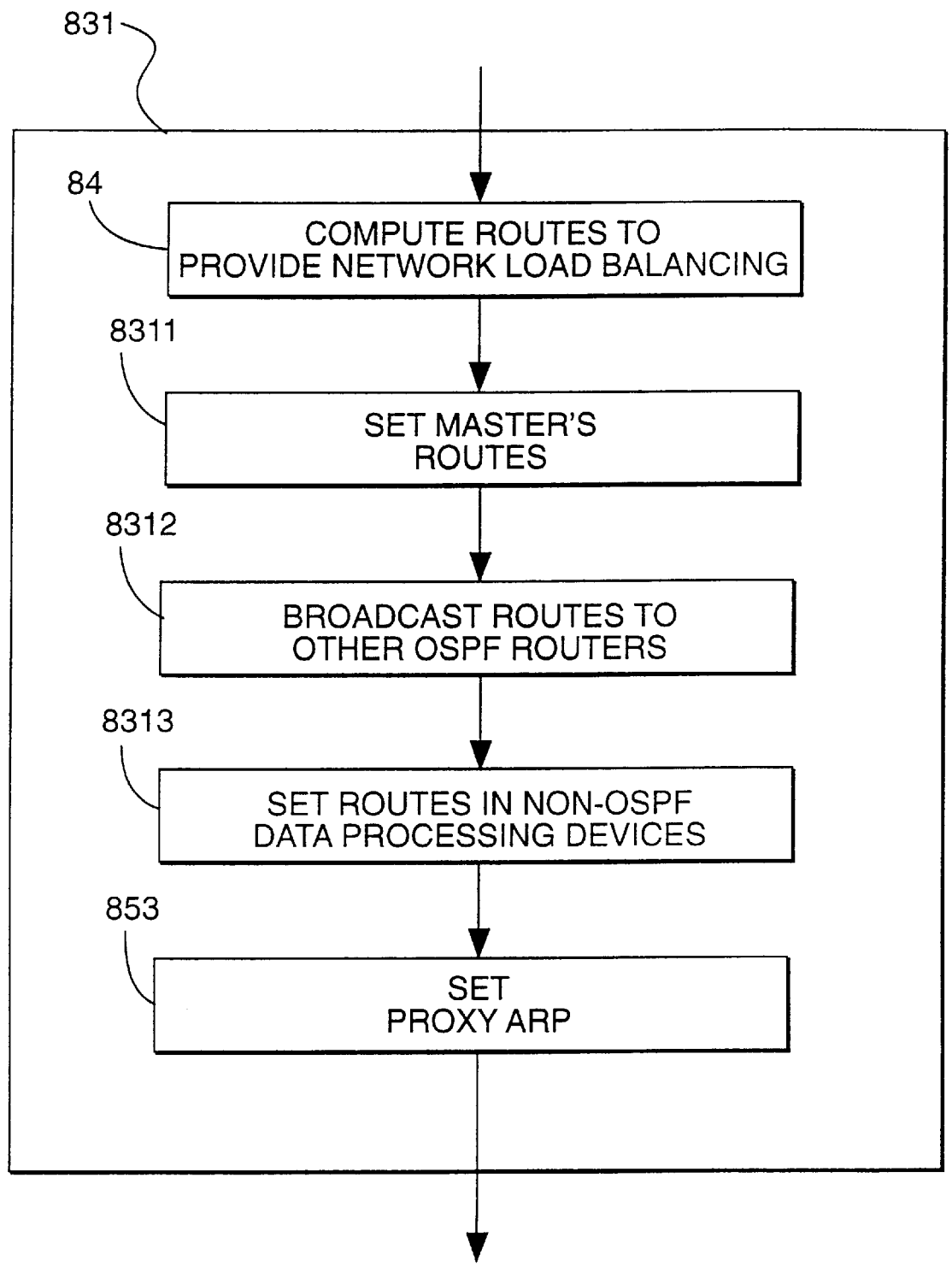
FIG. 18 is a flowchart of a detailed procedure executed by an OSPF master device.
Figure 19:
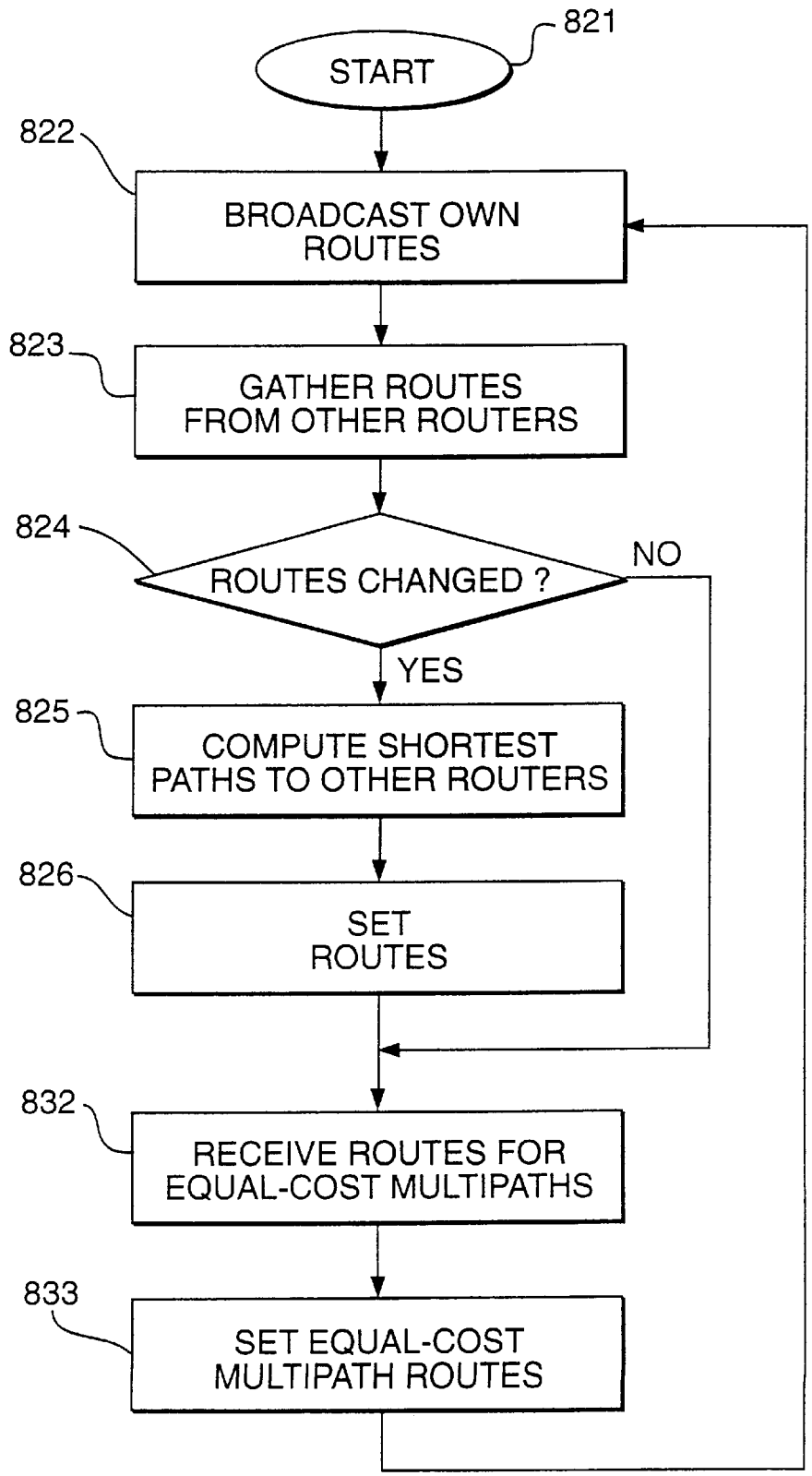
FIG. 19 is a flowchart of a procedure executed by an OSPF slave device.

The basic algorithm of the master is shown in FIG. 17. Step 822 to step 826 are shown in FIG. 4. The OSPF basic algorithm is extended by an additional step (step 831) and executed periodically. This step 831 is detailed in FIG. 18. In FIG. 18, first, a traffic balance calculation algorithm (step 84) is executed. The step 84 is explained in FIG. 9. Next, the routes in the master data processing device are set (step 8311). Then, the selected routes are broadcast to the slave data processing devices (step 8312). Next, the routes are set in the data processing devices that do not exchange data by OSPF (step 8313). Finally, when Proxy ARP is used along with OSPF, the Proxy ARP correspondence is set (step 853). The basic algorithm for the slave is shown in FIG. 19. Step 822 to step 826 are shown in FIG. 4. Here the basic OSPF algorithm is extended by two additional steps (step 832 and step 833) and also periodically executed. In the first step of the two additional steps, the slave data processing device receives the selected routes broadcast by the master and, at the next step (step 833), sets its own routes accordingly. It should be noted that the special exchange of data is performed independently of the OSPF protocol and thus there is no need to change the OSPF protocol. In the master and slave, when the router to be used changes as a result of the status change in the router, the master and slave should select a route arbitrarily from those available until a traffic balance calculation result is obtained and broadcast. Otherwise, the previous route, if still valid, should be retained. This route then changes depending on the result of the traffic distribution algorithm (84).

Figure 20:
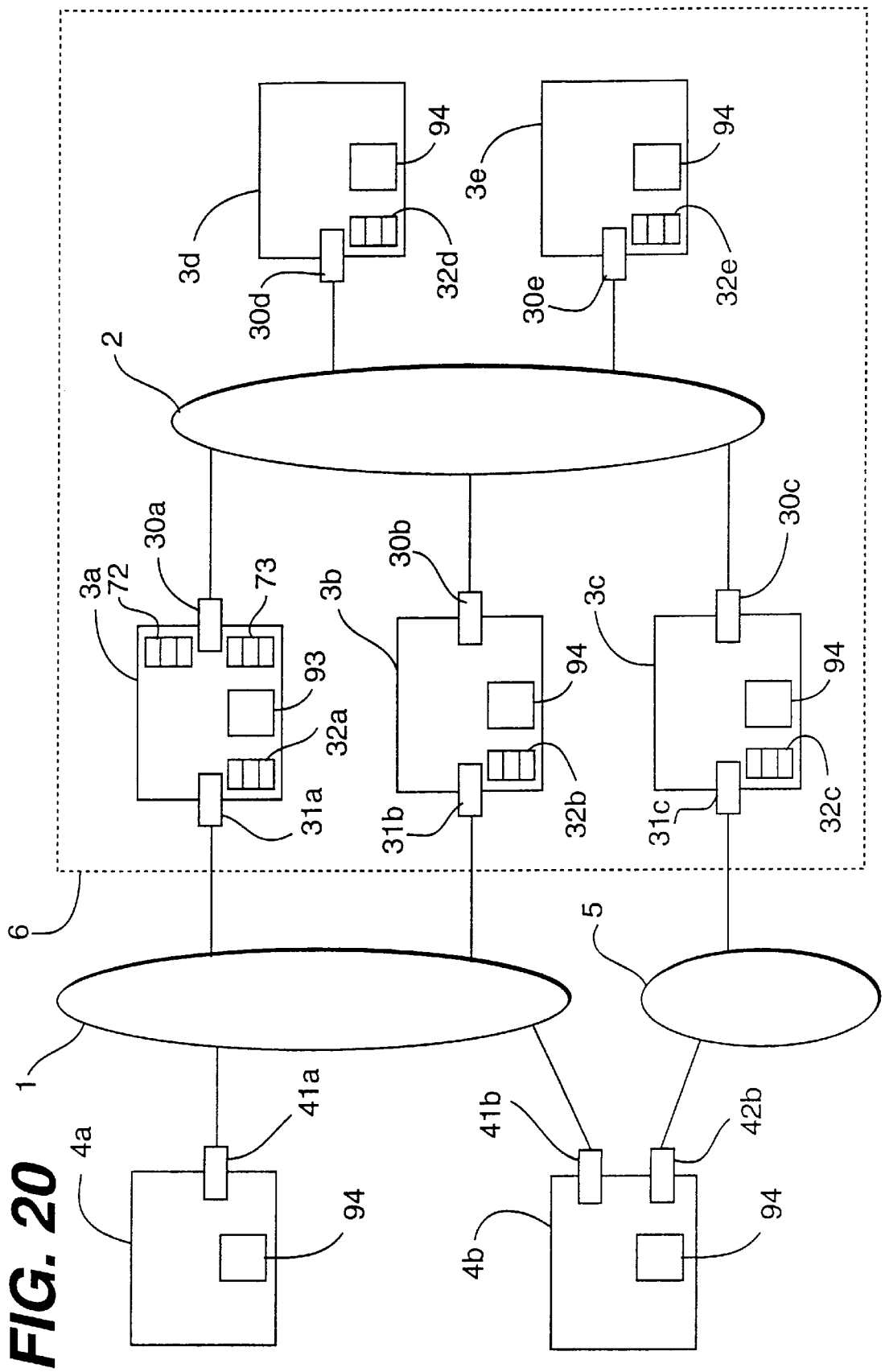
FIG. 20 is a block diagram showing an embodiment when only OSPF is used.
Figure 21:
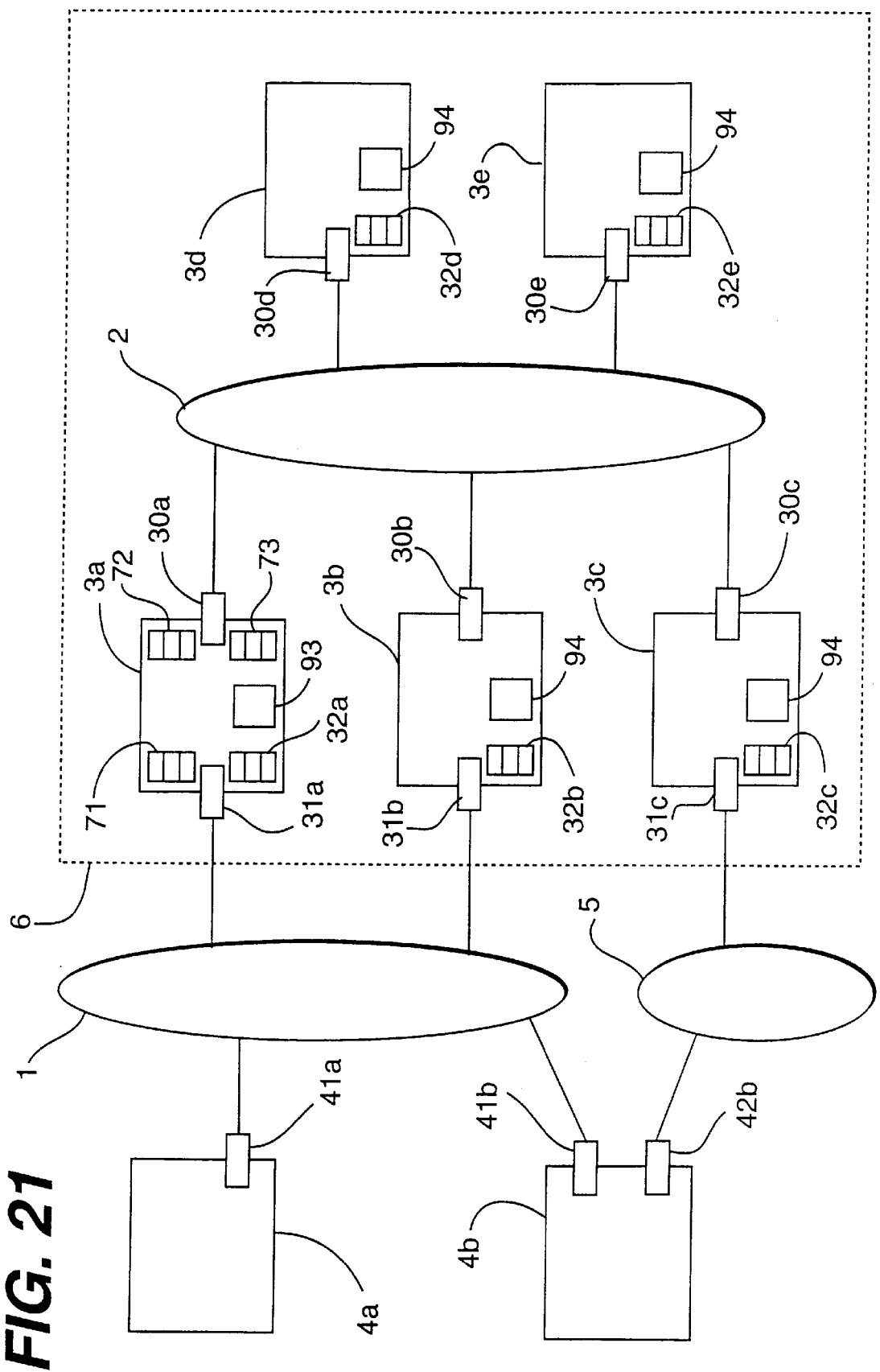
FIG. 21 is a block diagram showing an embodiment when only OSPF is used with Proxy ARP.

Two preferred embodiments of control add-on for the master 93 and slave 94 are shown in FIGS. 20 and 21. In the embodiment of FIG. 20, the OSPF is used in all networks (1, 2, 5). In FIG. 20, the control add-on of the master 93 is located in the data processing device 3*a*. Alternatively, it may be located any of the data processing devices (3*a*, 3*b*, 3*c*, 3*d*, 3*e*, 4*a*, 4*b*) that exchange data by the OSPF. In the embodiment of FIG. 21, the OSPF is used in one or more networks (in the figure, network 2), and Proxy ARP is used to set routes for the traffic coming from one or more networks (in the figure, network 1) adjacent to the network that uses the OSPF. The control add-on of the master 93 is located in the same data processing device in which the ARP cache (71) is located, in order to facilitate the setup of the ARP cache (71). Alternatively, the master may be located in any network using the OSPF, and the ARP cache (71) may be located in any data processing device (3*a*, 3*b*, 4*a*, 4*b*) in the target network.

The three examples for the explicit routing table setup and the Proxy ARP operate in a similar way to the case of the OSPF, in that the same routes may be selected by the algorithm (84) similarly to the algorithm (81) which selects routers through the shortest path selection (825), and in that the routes (32*a*, 32*b*, 32*c*, 32*d*, 32*e*) set in the routing table of the data processing devices in the network of interest and the linkage set in the ARP cache (71) may be the same. The same also applies to the parallel processing device (6).

This invention has five advantages.

First, good networking performance is provided by dynamically balancing the network traffic among routers between two networks.

Second, the invention takes the routing traffic from a data processing device having a higher processing load, thereby utilizing the data processing devices more effectively and increasing the job processing capability.

Third, in the case of failure of one or more routers, the invention transparently changes the routing of the Proxy ARP to improve the networking reliability.

Fourth, this invention has compatibility with the existing network protocols and thus these protocols need not be changed. In the case of the explicit route setup and the Proxy ARP, the operating system of the data processing devices does not need any change. When there are two or more equivalent paths when the invention is applied to the OSPF protocol, only the control add-on for executing the OSPF protocol needs to be changed.

Fifth, in the case of parallel processing devices, because not all nodes (data processing devices) require external network interfaces to communicate with other networks efficiently, the cost of parallel processing devices can be reduced.

While preferred embodiments have been set forth with specific details, further embodiments, modifications and variations are contemplated according to the broader aspects of the present invention, all as determined by the spirit and scope of the following claims.

We claim:

1. In a first network and a second network, each interconnecting a plurality of data processing devices and interconnected by a subset of the data processing devices, the data processing devices interconnecting the first and second networks acting as routers and being able to execute user processes, a networking method to select routes to balance network traffic among the data processing devices that interconnect the first and second networks, comprising:

a first step of obtaining an amount of network traffic flow between the data processing devices of the first and second networks;

a second step of obtaining processing load dependent on execution of the user processes of the data processing devices interconnecting the first and second networks and converting the processing load to an amount of network traffic; and a third step of selecting each data processing device route according to the amount of network traffic flow and the converted amount of network traffic, in a way that network traffic flow between the data processing devices interconnecting the first and second networks is distributed among the data processing devices of the second network, so that the network traffic flow among the data processing devices interconnecting the first and second networks is balanced.

2. A networking method according to claim 1, wherein the Address Resolution Protocol (ARP) and the Proxy ARP method are used in the first network and dynamically balances the network traffic from the first network to the second network among the data processing devices interconnecting the first and second networks, the networking method further comprising:

a fourth step of correlating, by the Proxy ARP, network addresses of the data processing devices of the second network with physical addresses of the interfaces connected to the first network of the data processing devices interconnecting the first and second networks, the data processing devices being selected as the routers for the data processing devices of the second network, wherein the first, second, third and fourth steps are repeated.

3. A networking method according to claim 2, wherein the data processing devices connected to the second network are nodes of a parallel processing device, and the first network connects the parallel processing device to other data processing devices.

4. A networking method according to claim 1, wherein at the third step, the network traffic of the data processing devices from the first network to the second network is distributed among only data processing devices interconnecting the first and second networks which have no malfunction that prevents the transfer of the network traffic between the first and second networks.

5. A networking method according to claim 1, further comprising:

a step of changing routes to the first network in a routing table of each of the data processing devices of the second network to data processing devices interconnecting the first and second networks that are selected to act as the routers for the data processing devices of the second network, wherein the network traffic from the second network to the first network is balanced dynamically among the data processing devices interconnecting the first and second networks.

6. A networking method according to claim 5, wherein the data processing devices connected to the second network are nodes of a parallel processing device, and the first network connects the parallel processing device to other data processing devices.

7. A networking method according to claim 1, wherein an Open Shortest Path First (OSPF) protocol is used in the second network and dynamically balances the network traffic from the second to the first network among the data processing devices interconnecting the first and second networks, the networking method further comprising:

a step of deciding routes of other data processing devices by one data processing device, according to the amount of network traffic flow, and a step of broadcasting the decided routes to the other data processing devices by using the OSPF protocol.

8. A networking method according to claim 7, wherein the data processing devices connected to the second network are nodes of a parallel processing device, and the first network connects the parallel processing device to other data processing devices.

9. A networking method according to claim 1, wherein an Open Shortest Path First (OSPF) protocol is used in the second network and dynamically balances the network traffic from the second to the first network among the data processing devices interconnecting the first and second networks, the networking method further comprising:

a step of receiving routes broadcast by other data processing devices; and a step of setting routes on the data processing devices which receive the broadcast routes, according to the received routes.

10. A networking method according to claim 8, wherein the data processing devices connected to the second network are nodes of a parallel processing device, and the first network connects the parallel processing device to other data processing devices.

11. A networking method according to claim 1, wherein the data processing devices connected to the second network are nodes of a parallel processing device, and the first network connects the parallel processing device to other data processing devices.

12. In a first network and a second network, each interconnecting a plurality of data processing devices, both networks being interconnected by routers which are a subset of the data processing devices being able to execute user processes, a networking method on one of the data processing devices comprising:

a step of gathering an amount of a network traffic flow among the data processing devices of the first network and the second network;

a step of obtaining processing load dependent on execution of the user processes of the data processing devices which interconnect the first and second networks and converting the processing load to an amount of network traffic;

a step of computing routes to provide network traffic balancing among the data processing devices which interconnect the first and the second networks, according to the amount of the network traffic flow and the converted amount of network traffic;

a step of setting routes on one data processing device based on the computed routes; and a step of sending the computed routes from the one data processing device to other data processing devices so that the other data processing devices set routes according to the sent routes.

13. In a first network and a second network, each interconnecting a plurality of data processing devices, both networks being interconnected by routers which are a subset of the data processing devices being able to execute user processes, a networking method on one of the data processing devices comprising:

a first step of gathering routes from other routers;

a second step of setting routes on one data processing device based on the gathered routes;

a third step of gathering an amount of a network traffic flow on the data processing devices that interconnect the first network and the second network;

a fourth step of obtaining processing load dependent on execution of the user processes of the data processing devices which interconnect the first and second networks and converting the processing load to an amount of network traffic;

a fifth step of computing routes to provide network traffic balancing among data processing devices which interconnect the first and the second networks, according to the amount of the network traffic flow and the converted amount of network traffic;

a sixth step of setting routes on one data processing device, based on the computed routes; and a seventh step of sending the computed routes to other data processing devices, so that the other data processing devices set routes according to the sent routes.

14. A networking method according to claim 13, wherein said first and second steps are part of an Open Shortest Path First (OSPF) protocol.

* * * * *